(12) United States Patent
Felt et al.

(10) Patent No.: US 7,080,119 B2
(45) Date of Patent: Jul. 18, 2006

(54) SYSTEM AND METHOD FOR TRANSACTION PROCESSING WITH DELEGATED COMMIT FEATURE

(75) Inventors: Edward P. Felt, deceased, late of Matawan, NJ (US); by Sandra V. Felt, legal representative, Matawan, NJ (US); Priscilla Fung, Union City, CA (US); Alexander J. Somogyi, Bedminster, NJ (US); Sriram Srinivasan, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 410 days.

(21) Appl. No.: 10/196,297

(22) Filed: Jul. 15, 2002

(65) Prior Publication Data

US 2003/0046342 A1    Mar. 6, 2003

Related U.S. Application Data

(60) Provisional application No. 60/308,753, filed on Jul. 30, 2001, provisional application No. 60/306,100, filed on Jul. 17, 2001.

(51) Int. Cl.
G06F 15/16 (2006.01)
(52) U.S. Cl. ........................ 709/203; 709/223; 709/224
(58) Field of Classification Search ................ 709/203, 709/226, 224, 223
See application file for complete search history.

(56) References Cited

U.S. PATENT DOCUMENTS

| | | | |
|---|---|---|---|
| 5,586,312 A | 12/1996 | Johnson et al. | 395/610 |
| 5,857,100 A | 1/1999 | Phillips et al. | 395/671 |
| 5,958,004 A | 9/1999 | Helland et al. | 709/101 |
| 5,987,502 A * | 11/1999 | Banks et al. | 709/203 |
| 6,038,589 A * | 3/2000 | Holdsworth et al. | 709/201 |
| 6,101,527 A * | 8/2000 | Lejeune et al. | 709/201 |
| 6,266,698 B1 | 7/2001 | Klein et al. | 709/227 |
| 6,275,863 B1 * | 8/2001 | Leff et al. | 709/248 |
| 6,298,072 B1 | 10/2001 | Koliczew | 370/503 |
| 6,308,287 B1 | 10/2001 | Mitchell et al. | 714/19 |
| 6,338,146 B1 | 1/2002 | Johnson et al. | 714/2 |
| 2002/0038243 A1 | 3/2002 | Amano et al. | |
| 2002/0087366 A1 | 7/2002 | Collier et al. | |

* cited by examiner

Primary Examiner—Frantz B. Jean
(74) Attorney, Agent, or Firm—Fliesler Meyer, LLP

(57) ABSTRACT

The invention provides a transaction service that allows lightweight clients to perform a delegated commit at a server. This process allows lightweight clients to begin and terminate transactions, while the actual responsibility for transaction commit processing is delegated to a commit server and transaction manager running on the machine hosting the server. Client applications do not require a local transaction server. The commit server can be selected from the plurality of servers accessible to the client, and is responsible for committing the transaction to other (participating) servers taking part in the transaction.

27 Claims, 12 Drawing Sheets

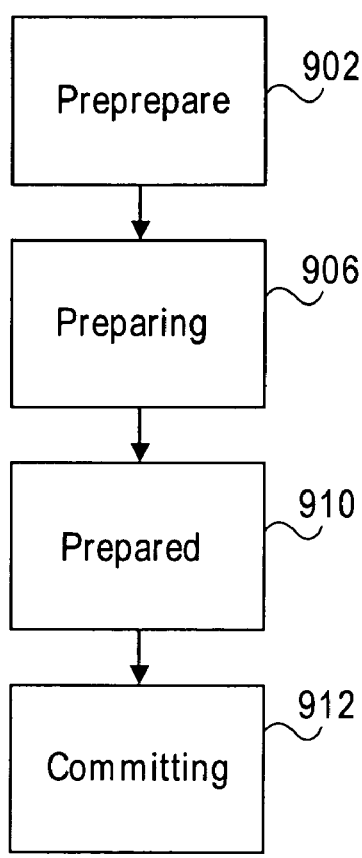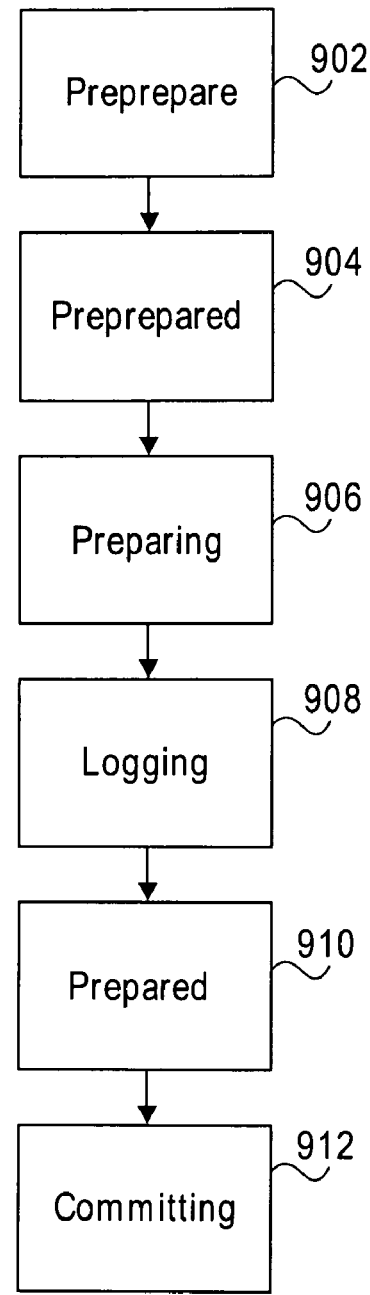
FIG. 11A
FIG. 11B

SYSTEM AND METHOD FOR TRANSACTION PROCESSING WITH DELEGATED COMMIT FEATURE

CLAIM OF PRIORITY

This application claims priority from provisional applications "SYSTEM FOR TRANSACTION PROCESSING WITH DELEGATED COMMIT FEATURE, " Application No. 60/306,100, filed Jul. 17, 2001, and "SYSTEM FOR TRANSACTION PROCESSING WITH DELEGATED COMMIT FEATURE", Application No. 60/308,753, filed Jul. 30, 2001 and which applications are incorporated herein by reference.

CROSS REFERENCES

This application is related to copending utility applications "SYSTEM FOR TRANSACTION PROCESSING WITH TRANSACTION PROPERTY FEATURE", application Ser. No. 10/196,687, Inventors: Edward P. Felt, Priscilla Fung, Alex Somogyi, and Sriram Srinivasan, filed Jul. 15, 2002; and "SYSTEM FOR TRANSACTION PROCESSING WITH SYNCHRONIZED CALLBACK PROCESSING FEATURE", application Ser. No. 10/196,322, Inventors: Edward P. Felt, Priscilla Fung, Alex Somogyi, and Sriram Srinivasan, filed Jul. 15, 2002; all of which are herein incorporated by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application and transaction servers and particularly to a system for allowing a delegated commit of a transaction or message.

BACKGROUND OF THE INVENTION

The Java 2 Platform, Enterprise Edition (J2EE) specification defines one of the current standards for developing multi-tier enterprise applications. J2EE provides a component-based approach to the design, development, assembly, and deployment of enterprise applications, which both reduces the cost and enables fasten design and implementation. The J2EE platform gives the developer a multi-tiered distributed application model, the ability to reuse components, a unified security model, and flexible transaction control. Not only can they deliver innovative customer solutions to market faster than ever, but the resultant platform-independent J2EE component-based solutions are not tied to the products and application program interfaces (APIs) of any one vendor.

The J2EE specification defines the following kinds of components: application client components; Enterprise JavaBeans (EJB); servlets and Java Server Pages (JSP) (also called Web components); and applets. A multi-tiered distributed application model implies that the application logic is divided into components according to function, and different application components may make up a J2EE application on the same or different servers. Where an application component is actually installed depends on which tier in the multi-tiered J2EE environment the application component belongs. These tiers are depicted in FIG. 1. As shown therein an application server tier 4 is used to develop EJB containers and/or presentation containers such as servlets, JSP, and html pages 14. These in turn are used as an interface between a client tier 2, where the clients 8 and client applications are deployed, and a backend tier 6, used for hosting enterprise or legacy applications such Enterprise Resource Planning (ERP) systems.

Client tier—These can be browsers, Java-based programs, or other Web-enabled programming environments running within the client tier, both inside and outside of corporate firewalls.

Application Server tier—Normally this tier hosts a combination of presentation logic and business logic to support client requests. Presentation logic is supported via JSP pages and servlets that display HTML pages, while business logic is supported via Remote Method Invocation (RMI) objects and EJBs 12. EJBs rely upon the container environment for transactions, lifecycle and state management, resource pooling, security, etc., which together make up the run time environment in which the beans are executed.

Back-end tier—This is generally a combination of existing applications and data stores. It is also referred to as the Enterprise Information Systems (EIS) tier, since it may include such systems as Enterprise Resource Planning (ERP), mainframe transaction processing, database systems, and other legacy information systems.

Since the components of a J2EE application run separately, and often on different devices, there needs to be a way for client and application server tier code to look up and reference other code and resources. Client and application code can, for example, use the Java Naming and Directory Interface (JNDI) 16 to look up user-defined objects such as enterprise beans, and environment entries such as the location of the Java Database Connector (JDBC) DataSource objects, which in turn are used for looking up resources in backend tier, and message connections.

Application behavior such as security and transaction management can be configured at deployment time on Web and enterprise bean components. This deployment time feature decouples application logic from the configuration settings that might vary with the assembly. The J2EE security model lets a developer configure a Web or enterprise bean component so that system resources are accessed only by authorized users. For example, a Web component can be configured to prompt for a user name and password. An Enterprise Bean component can be configured so that only persons in specific groups can invoke certain kinds of its methods. Alternatively, a servlet component might be configured to have some of its methods accessible to everyone, and a few methods accessible to only certain privileged persons in an organization. The same servlet component can be configured for another environment to have all methods available to everyone, or all methods available to only a select few.

Some application servers, such as the WebLogic Server product from BEA Systems, Inc., San Jose, Calif., use an Access Control List (ACL) mechanism that allows for fine-grained control of the usage of components running on the server. Using an ACL, a developer can define at the Java Method level what can, or cannot, be executed by which user or group of users. This ACL mechanism covers anything that runs on the application server except for EJBs, which have their own access control mechanism defined in the EJB specification. Security realms allow the administrator to import information from existing authorization or authentication systems into the ACL.

Java Servlets

A servlet is a program that extends the functionality of a Web server. A servlet receives a request from a client, dynamically generates the response (possibly querying databases to fulfill the request), and then sends the response containing an HTML or XML document to the client. Servlets are similar to CGI but are typically easier to write, since servlets use Java classes and streams. They execute faster because servlets are compiled to Java byte code and at run time the servlet instance is kept in memory, each client request spawning a new thread. Servlets make it easy to generate data to an HTTP response stream in a dynamic fashion. Each client request is performed as a new connection, so flow control does not come naturally between requests. To allow for this session management maintains the state of specific clients between requests. In some application servers, servlets make use of the HTTP session object to save their state between method requests. This object can be replicated in a clustered environment for failover purposes.

Java Server Pages

JSP pages are a text-based, presentation-centric way to develop servlets. JSP pages offer all the benefits of servlets, and when combined with a JavaBeans class, provide an easy way to keep content and display logic separate. Both JSP pages and servlets are more desirable than Common Gateway Interface (CGI), because they are platform-independent, and use less overhead. JSP pages can be used with JavaBeans classes to define Web templates for building a Web site made up of pages with a similar look and feel. The JavaBeans class performs the data rendering, so the templates have no Java code. This means they can be maintained by an HTML editor. Simple Web-based application using a JSP page can be used to bind content to application logic using custom tags or scriptlets instead of a JavaBeans class. Custom tags are bundled into tag libraries that are imported into a JSP page. Scriptlets are small Java code segments embedded directly in the JSP page.

Database Access Services (JDBC)

JDBC acts as a bridge to relational databases, and is modeled on the ODBC (Open Database Connectivity) specification. It decouples the database from the program code through the use of drivers. Some implementations of JDBC provide support for advanced data types, and also support the functionality of scrollable result sets and batch updates.

Java Messaging Services (JMS)

JMS is the J2EE mechanism used to support the exchange of messages between Java programs. This is how Java supports asynchronous communication, wherein the sender and receiver don't need to be aware of each other and thus can operate independently. JMS supports two messaging models:

Point to point—which is based on message queues. In this model message producer sends a message to a queue. A message consumer can attach itself to a queue to listen for messages. When a message arrives on the queue, the consumer takes it off the queue and responds to it. Messages can be sent to just one queue and will be used by just one consumer. Consumers have the option to filter messages to specify the exact message types they want.

Publish and subscribe—which allows producers to send messages to a topic and for all the registered consumers for that topic to retrieve those messages. In this case, many consumers can receive the same message.

Java Interface Definition Language (IDL)

CORBA objects use an IDL to specify a contract, ie. how they are going to interact with other objects. With Java IDL, contracts may be defined between the Java world and the CORBA world. Starting with Sun's JDK 1.2, an ORB is included, which allows Java applications to invoke remote CORBA objects via the Internet InterORB (IIOP) protocol.

Enterprise JavaBeans (EJB)

EJB components are designed to encapsulate business logic, so that the developer does not have to be concerned with programming code for typical tasks such as database access, transaction support, security, caching, and concurrency. In the EJB specification these tasks are the responsibility of the EJB container. An enterprise bean consists of interfaces and classes. Clients access enterprise bean methods through the enterprise bean's home and remote interfaces. The home interface provides methods for creating, removing, and locating the enterprise bean and the remote interface provides the business methods. At deployment time, the container creates classes from these interfaces that it then uses to provide access to clients seeking to create, remove, locate, and call business methods on the enterprise bean. The enterprise bean class provides the implementations for the business methods, create methods, and finder methods; and if the bean manages its own persistence, provides implementations for its lifecycle methods.

There are two types of enterprise beans: entity beans and session beans. A session bean represents a transient conversation with a client, and might execute database reads and writes. A session bean can invoke the JDBC calls itself, or it can use an entity bean to make the call, in which case the session bean is a client to the entity bean. A session bean's fields contain the state of the conversation and are transient. If the server or client crashes, the session bean is gone.

An entity bean represents data in a database and the methods to act on that data. In a relational database context for a table of employee information, there may be one bean for each row in the table. Entity beans are transactional and long-lived. As long as the data remains in the database, the entity bean exists. This model can be easily used for relational databases and is not restricted to object databases.

Session beans can be stateful or stateless. A stateful session bean contains conversational state on behalf of the client. The conversational state is the session bean's instance field values plus all objects reachable from the session bean's fields. Stateful session beans do not represent data in a persistent data store, but they can access and update data on behalf of the client. Stateless session beans do not have any state information for a specific client. They typically provide server-side behavior that does not maintain any particular state. Stateless session beans require fewer system resources. A business object that provides a generic service or represents a shared view of stored data is a good candidate for a stateless session bean.

An enterprise bean using container-managed persistence to access a relational database does not require the developer to use any JDBC 2.0 APIs for database access because the container handles this. However, if bean-managed persistence is used, or if there is a need to access an enterprise information system other than a relational database, then the appropriate code to do it must be provided.

In the case of an enterprise bean using bean-managed persistence to access a database, the bean's lifecycle methods with JDBC 2.0 API code must be implemented to handle loading and storing data and maintaining consistency between the run time and persistent database storage. While the Web tier uses HTTP or HTTPS to transfer data between tiers, the EJB tier uses RMI-IIOP. RMI-IIOP is a full-scale distributed computing protocol that gives any client or Web tier program accessing an enterprise bean direct access to the services in the EJB tier. These services include JNDI for referencing enterprise beans, Java Messaging Service (JMS) for sending and receiving asynchronous messages, and JDBC for relational database access.

Transaction Management

One of the most fundamental features of any application server, such as the WebLogic Server system is transaction management. Transactions are a means to guarantee that database transactions are completed accurately and that they take on all the "ACID" properties of a high-performance transaction, including:

Atomicity—all changes that a transaction makes to a database are made permanent; otherwise, all changes are rolled back.

Consistency—a successful transaction transforms a database from a previous valid state to a new valid state.

Isolation—changes that a transaction makes to a database are not visible to other operations until the transaction completes its work.

Durability—changes that a transaction makes to a database survive future system or media failures.

The J2EE transaction model lets the application developer specify, at deployment time, the relationships among methods which comprise a single transaction, so that all methods in one transaction are treated as a single unit. This is desirable because a transaction is a series of steps that must all complete, or if they do not all complete then all are reversed. For example, the developer might have a series of methods in an enterprise bean that move money from one bank account to another, by debiting the first account, and crediting the second account. In this example, they would want the entire transfer operation to be treated as one unit, so that if there is a failure after the debit and before the credit, then the debit is rolled back.

Transaction attributes are specified on an application component during assembly, allowing the developer to group methods into transactions across application components. In this manner application components can be changed within a J2EE application, and the transaction attributes reassigned without changing code. The Java Transaction Service (JTS) and Java Transaction API (JTA) form the basis of the transactional support in J2EE and more specifically for EJB and JDBC 2.0. The JTS specification is a low-level application program interface (API) for transaction management that maps Java to the Object Management Group (OMG) Object Transaction Service. The JTA specification was developed by Sun Microsystems in cooperation with leading industry partners in the transaction processing and database system arena and specifies standard Java interfaces between a transaction manager, the resource manager, the application server, and the transactional applications. Specifically, JTA is a high-level API that consists of two parts:

Transaction Interface—This enables the work done by distributed components to be bound by a global transaction, and is a way of marking or identifying groups of operations constituting a transaction.

XA Resource Interface—an interface based upon the X/Open or XA interface that enables the handling of distributed transactions. These involve the coordination of transactions across more than one resource, such as within or between a database or queue.

Most of the time the developer does not need to be concerned about programming explicit transactions with JTA, since that work is performed through the JDBC and EJB API's handled by the container and configured by the application deployment descriptor. The developer can instead focus on the design of the transaction, rather than on its implementation.

WebLogic Server supports both distributed transactions and a two-phase commit protocol for enterprise applications. A distributed transaction is a transaction that updates multiple resource managers (such as databases) in a coordinated manner. In contrast, a local transaction updates a single resource manager. The two-phase commit protocol is a method of coordinating a single transaction across two or more resource managers. It guarantees data integrity by ensuring that transactional updates are committed in all of the participating databases, or are fully rolled back out of all the databases, reverting to the state prior to the start of the transaction. In other words, either all the participating databases are updated, or none of them are updated. Distributed transactions involve the following participants:

Transaction originator—initiates the transaction. The transaction originator can be a user application, an Enterprise JavaBean, or a JMS client.

Transaction manager—manages transactions on behalf of application programs. A transaction manager coordinates commands from application programs to start and complete transactions by communicating with all resource managers that are participating in those transactions. When resource managers fail during transactions, transaction managers help resource managers decide whether to commit or roll back pending transactions.

Recoverable resource—provides persistent storage for data. The resource is most often a database.

Resource manager—provides access to a collection of information and processes.

Transaction-aware JDBC drivers are common resource managers. Resource managers provide transaction capabilities and permanence of actions; they are entities accessed and controlled within a distributed transaction. The communication between a resource manager and a specific resource is called a transaction branch.

The first phase of the two-phase commit protocol is called the prepare phase. The required updates are recorded in a transaction log file, and the resource must indicate, through a resource manager, that it is ready to make the changes. Resources can either vote to commit the updates or to roll back to the previous state. What happens in the second phase depends on how the resources vote. If all resources vote to commit, all the resources participating in the transaction are updated. If one or more of the resources vote to roll back, then all the resources participating in the transaction are rolled back to their previous state.

Support for Business Transactions

Transactions are appropriate in the example situations described below (although these situations are merely illustrative and not exhaustive).

As a first example, the client application needs to make invocations on several objects, which may involve write operations to one or more databases. If any one invocation is unsuccessful, any state that is written (either in memory or, more typically, to a database) must be rolled back. For example, consider a travel agent application. The client application needs to arrange for a journey to a distant location; for example, from Strasbourg, France, to Alice Springs, Australia. Such a journey would inevitably require multiple individual flight reservations. The client application works by reserving each individual segment of the journey in sequential order; for example, Strasbourg to Paris, Paris to New York, New York to Los Angeles. However, if any individual flight reservation cannot be made, the client application needs a way to cancel all the flight reservations made up to that point. The client application needs a conversation with an object managed by the server application, and the client application needs to make multiple invocations on a specific object instance. The conversation may be characterized by one or more of the following:

Data is cached in memory or written to a database during or after each successive invocation; data is written to a database at the end of the conversation; the client application needs the object to maintain an in-memory context between each invocation; that is, each successive invocation uses the data that is being maintained in memory across the conversation; at the end of the conversation, the client application needs the ability to cancel all database write operations that may have occurred during or at the end of the conversation.

As an alternate example, consider an Internet-based online shopping cart application. Users of the client application browse through an online catalog and make multiple purchase selections. When the users are done choosing all the items they want to buy, they proceed to check out and enter their credit card information to make the purchase. If the credit card check fails, the shopping application needs a mechanism to cancel all the pending purchase selections in the shopping cart, or roll back any purchase transactions made during the conversation. Within the scope of a single client invocation on an object, the object performs multiple edits to data in a database. If one of the edits fails, the object needs a mechanism to roll back all the edits. (In this situation, the individual database edits are not necessarily EJB or RMI invocations. A client, such as an applet, can obtain a reference to the Transaction and TransactionManager objects, using JNDI, and start a transaction). As another example, consider a banking application. The client invokes the transfer operation on a teller object. The transfer operation requires the teller object to make the following invocations on the bank database: invoking the debit method on one account; and invoking the credit method on another account. If the credit invocation on the bank database fails, the banking application needs a mechanism to roll back the previous debit invocation.

A problem with the traditional methods of transaction management described above, is that they do not allow for lightweight clients to reliably participate in the transaction process. As referred to herein a lightweight client is typically a client which runs on a single-user, unmanaged desktop system that in turn has irregular availability. For example, PC (personal computer) or desktop owners may turn their desktop systems off when they are not in use. These single-user, unmanaged desktop systems should ideally not be required to perform complex and necessary network functions such as transaction coordination. In particular, unmanaged systems should not be responsible for ensuring the atomicity, consistency, isolation, and durability (ACID) properties desired of transactions involving server resources. A mechanism is required that removes the burden of such responsibilities from the client, and assists in the transaction commit process while ensuring overall transaction integrity.

SUMMARY OF THE INVENTION

The invention allows clients in a transaction processing system to perform a delegated commit, i.e. to delegate the commit phase of a transaction to another entity, typically a server. Delegated commits allow lightweight clients to begin the transaction, manage the active portion, and then terminate the transaction, while the actual responsibility for transaction commit processing is delegated to a transaction manager process running on a server machine. In this manner client applications do not require a local transaction server. Instead the remote implementation of the UserTransaction, which the clients use, delegates the actual responsibility of transaction coordination to the transaction manager on the server.

The benefits of such a mechanism include that the client is allowed to directly involve multiple servers during the active phase of the transaction, while the important task of atomically committing the transaction is delegated to a managed server that is typically more reliable than the client itself.

During a typical transaction's life cycle, there are several state transitions, including those between the active, hand-off, pre-preparing, preparing, logging, and commit states. In accordance with the invention, during the active state application code running on a client contacts several servers during execution of the transaction. The client is responsible for remembering which servers were contacted. In one embodiment, the first server contacted is designated as the "commit" server. When the client calls for the "commit", the responsibility for committing the transaction is delegated (ie. handed off) to the commit server. The commit server moves the transaction through the pre-preparing, preparing, logging, and commit steps. When the commit processing is complete, the commit server returns to the client. Other than the fact that the commit server is responsible for processing the commit, it may be a regular server, and in many instances any of the servers can assume the role of commit server. Which one actually ends up with the responsibility (and thus becomes the "commit server") depends on the actual implementation.

A client can obtain a reference to the UserTransaction and TransactionManager objects using JNDI, and can begin a transaction using either object reference. To get the Transaction object for the current thread, the client program invokes a getTransaction( ) method. The Transaction object returned from JNDI supports both the UserTransaction, and the TransactionManager interfaces.

The invention ensures transaction integrity by guaranteeing that a commit will not succeed unless all transactional objects involved in the transaction have completed the processing of their respective transactional requests. The transaction service provides checked transaction behavior that is equivalent to that provided by the standard request/response interprocess communication models defined by the Open Group (OMG) specification.

One embodiment of the invention comprises a system for transaction processing that delegates responsibility for a transaction commit process between a client and a server comprising a transaction interface that receives from a client a transaction to be committed at a server, a plurality of servers that receives the transaction, including at least one participating server that will participate in the transaction, and a server, selected from said plurality of servers to be a commit server, that commits said transaction at said at least one participating server, and communicates the result of said transaction commit process to said client process. Another embodiment of the invention comprises a method for transaction processing between a client and a server that allows responsibility for a transaction between the client and the server to be delegated to a commit server comprising the steps of receiving from a client a transaction to be committed at a server, determining from a plurality of servers, a commit server, said commit server being responsible for committing said transaction, and committing said transaction at a participating server, and communicating the result of said committing to said client.

BRIEF DESCRIPTION OF THE FIGURES

FIGS. 11 and 11b shows a schematic illustration of a subcoordinator state machine in accordance with an embodiment of the invention.

DETAILED DESCRIPTION

The invention provides a system and method to allow a client or client application to perform a delegated commit in a transaction or transaction processing system. This process allows clients to begin and terminate transactions, while the actual responsibility for transaction commit processing is delegated to a transaction manager running on a server. Because of this, the client application does not require a local transaction server, an important feature when the client is a lightweight client. A remote implementation of the user transaction which is used by the client delegates responsibility for transaction coordination to the transaction manager on the selected server.

The benefits of such a mechanism include that the client is allowed to directly involve multiple servers during the active phase of the transaction, while the critical work for atomically committing the transaction is delegated to a managed server that is typically more reliable than the client. This is particularly the case when the client is a lightweight client, such as a user, desktop machine, that is more prone to failure or error than an enterprise-level server might be.

Figure 1:
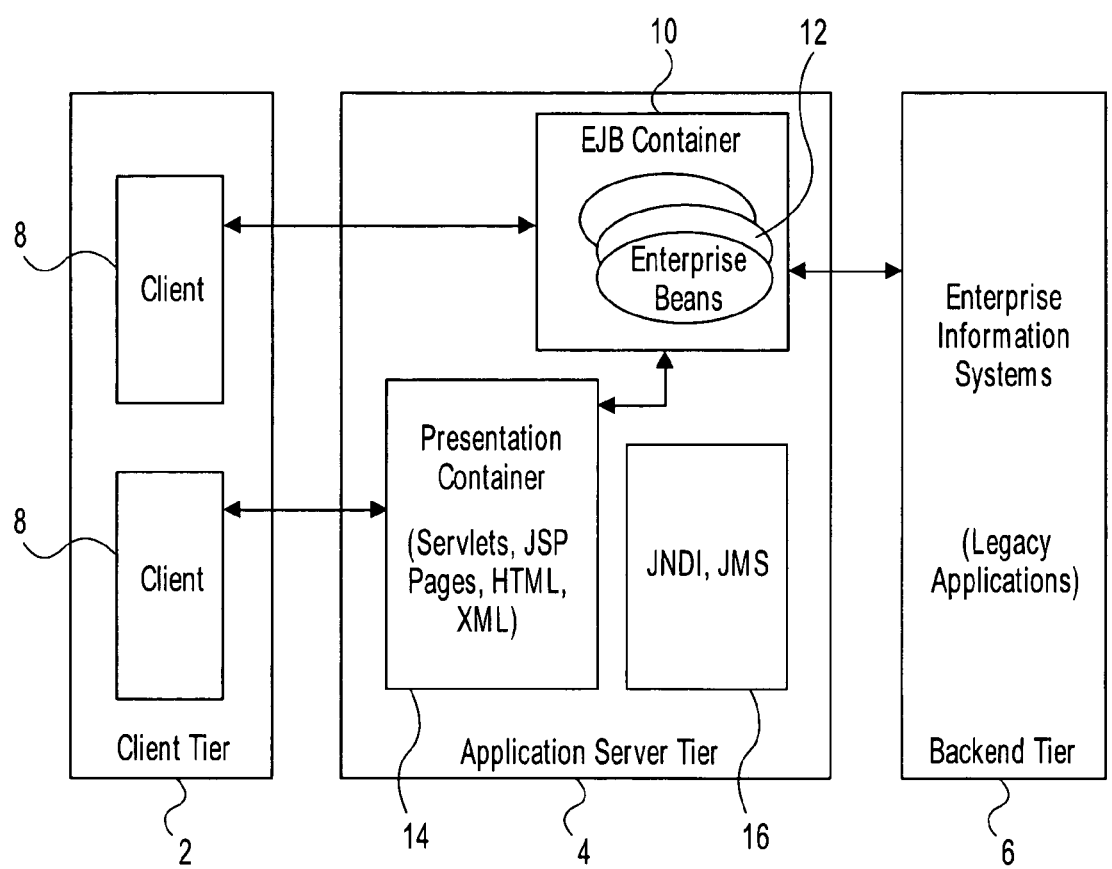
FIG. 1 shows an illustration of the J2EE architecture known in the prior art.
Figure 2:
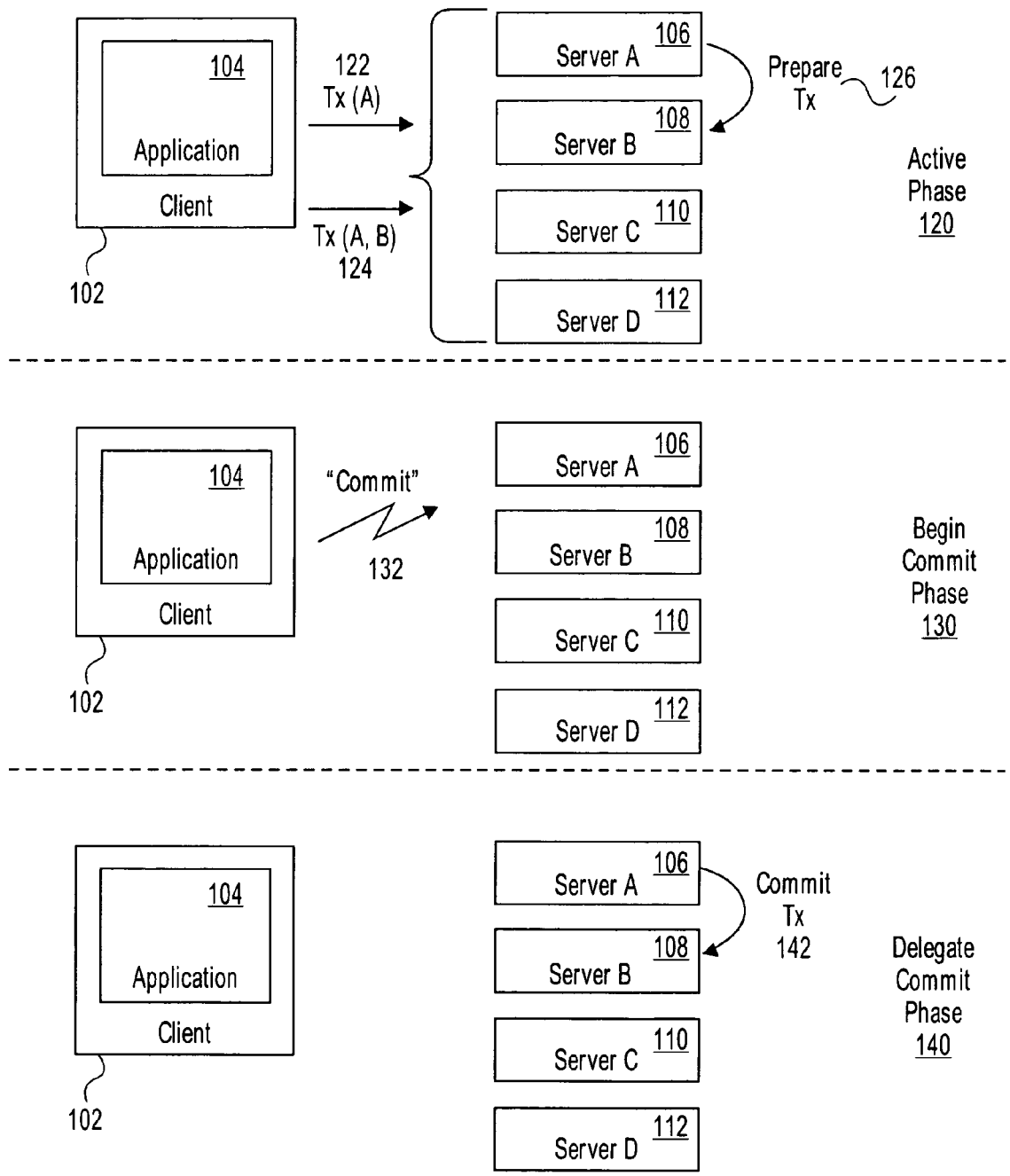
FIG. 2 shows an illustration of a delegated commit feature in accordance with an embodiment of the invention.

FIG. 2 illustrates a schematic of an embodiment of the invention, in which a client application delegates the responsibility for coordinating a transaction to one of multiple servers. As shown in FIG. 2, a client 102 including a client application 104 initiates or begins a transaction that involves at least one or many servers, including server A 106, server B 108, server C 110 and server D 112. During the active phase 120, the client may add a server from the transaction process, prior to the transaction commit phase. So, for example, the transaction may at first include a server A 122, or resources on that server, but at a later point in time during the active phase the client application may specify that the transaction should also include servers A and B 124. Each individual transaction is allocated a transaction coordinator or "commit server" from the pool of potential servers/coordinators. In the example shown in FIG. 2, server A 106 is chosen as the transaction coordinator/commit server, although it will be evident that any of the servers A, B, C, or D could equally be chosen as the transaction coordinator. When the transaction is finally committed, the transaction coordinator will take responsibility for coordinating the actual transaction, removing this burden from the client. As shown in FIG. 2, then server chosen as the transaction coordinator maintains the prepare phase information 126 that will enable it to commit the transaction, when and if the transaction is committed. During a begin commit phase 130 the client application sends a commit request 132 to the transaction coordinator, or to the server acting as the transaction coordinator. During a delegate commit phase 140 the server acting as the transaction coordinator (in this case server A 106), takes responsibility for committing the transaction 142 to the servers specified as part of the transaction context (in this case servers A 106 and B 108). Neither the client, nor the client application, is required to take any further part in the commit process. In this way the client can be a lightweight client, since it does not need to take part in any of the commit processing. The transaction coordinator has all the information necessary to commit the transaction.

While in FIG. 2, it can be seen that server A is selected as the transaction coordinator, in practice there are many techniques available to select or to specify a server to act as the transaction coordinator. In some implementations cases, the client can select the first server contacted to be the transaction coordinator. In other implementations and embodiments, the transaction coordinator can be selected from one of the plurality of servers according to particular rules or algorithms. During the active phase, the client passes its information on which servers should participate in the transaction to the transaction coordinator, so that the information can then be used during the commit phase. In one implementation, each of the servers are substantially the same, and any of the servers can act as transaction coordinators. In other implementations some servers may be specified as being transaction coordinators. In the context of Java transaction application, (JTA), the JTA can keep track of the transaction data in a data structure known as a transaction context. This transaction context is propagated to the transaction coordinator that is selected. The data structure/transaction context includes all the necessary information including the transaction coordinator id, that is subsequently used in the commit phase.

Figure 3:
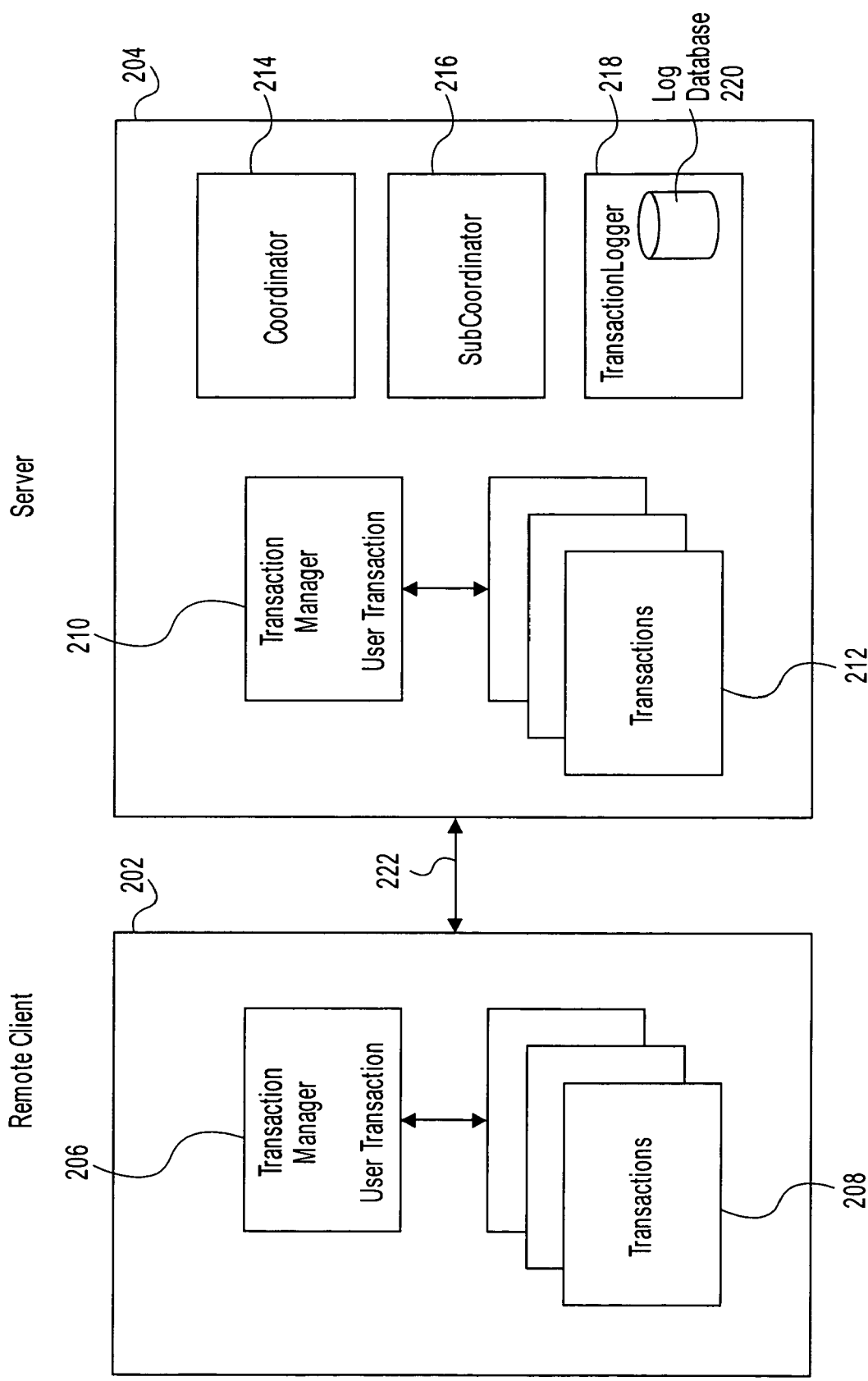
FIG. 3 shows an illustration of a typical client-server system for use with the invention.

FIG. 3 shows an illustration of a typical client-server system for use with the invention. A remote device or application 202, commonly referred to as a client application, communicates with an application server 204, or more typically with an application hosted at the application server. At the client end, a transaction manager 206 is used by the client applications to send and receive transaction 208 to the server (or to many servers). Similarly at the server end, a transaction manager 210 is used to manage transactions with the clients. In one embodiment the server may also logically include a transaction coordinator 214 process for initiating the transaction, subcoordinator process 216 for monitoring transaction status, and transaction logger process 218 for logging transactions. As transactions occur they can be recorded in a transaction log on database 220 for later audit, reference, or rollback purposes. The "Transaction Log" is needed for transaction recovery to ensure that the transaction is atomically committed across system failures. It will be evident that each of the transaction coordinator, subcoordinator, and logger processor may all run on the same server, or different servers. In one embodiment the first server reached by the client automatically assumes the role of coordinator. Other implementations and other embodiments may use different methods for choosing a coordinator.

Figures 4, 5, 6:
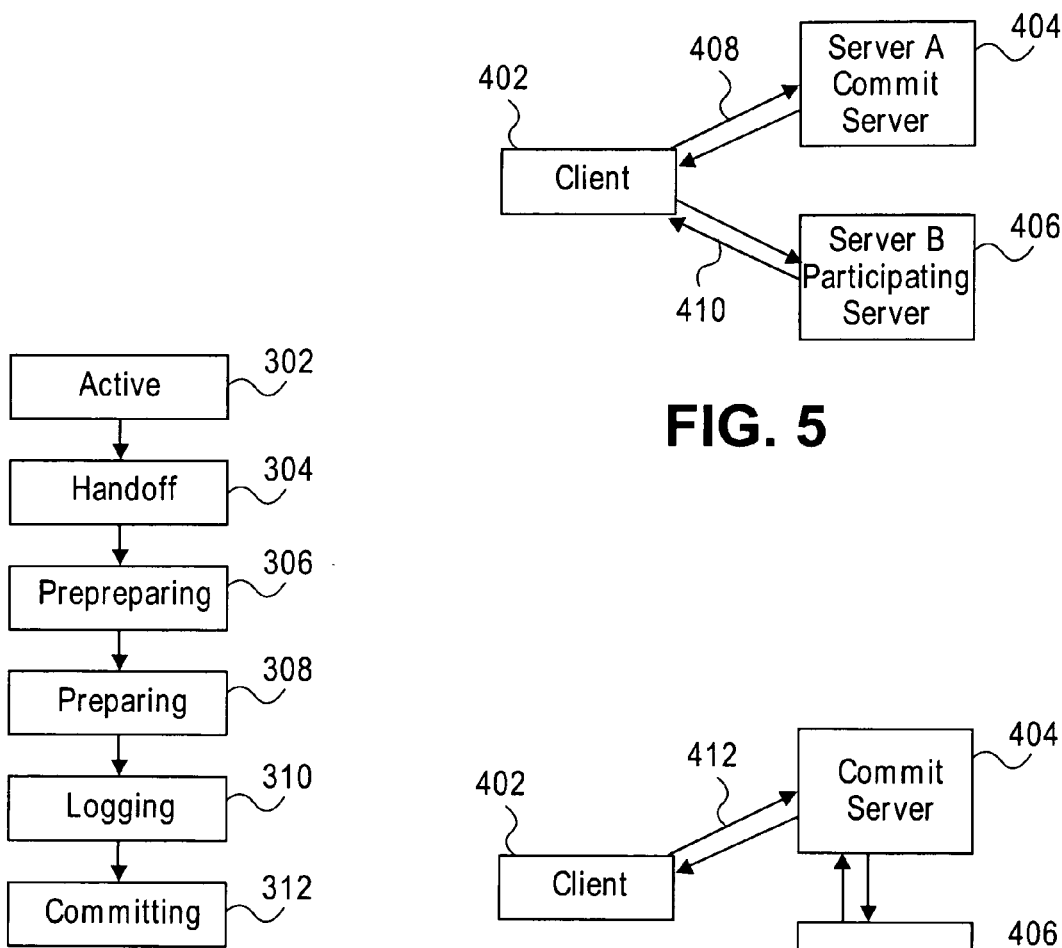
FIG. 4 shows an illustration of various transaction states in accordance with an embodiment of the invention.
FIG. 5 shows a first illustration of a transaction delegated commit system in accordance with an embodiment of the invention, including a commit server.
FIG. 6 shows a second illustration of a transaction delegated commit system in accordance with an embodiment of the invention, including a commit server.

FIG. 4 shows the various states or phases on the transaction lifecycle, including the Active 302, Handoff 304, Pre-Preparing 306, Preparing 308, Logging 310, and Committing 312 states. During any transaction's life cycle, there are thus several state transitions, including those between the active, handoff, pre-preparing, preparing, logging, and commit states. In the active state an application or application code running on a client is designed to contact several servers during the actual execution of the transaction. The client is responsible for remembering which servers were contacted, and sometimes other details regarding the transaction. In accordance with one embodiment of the invention the first server contacted is designated as the commit server or transaction coordinator. When the client calls for a "commit" the actual responsibility for committing the transaction is delegated or handed off to the commit server. Other than the fact that the commit server is responsible for processing the commit, it may be a regular server, and in many instances any of the servers can assume the role of a commit server. Which one actually ends up with the responsibility (and thus becomes the "commit server") depends on the actual implementation.

FIG. 5 shows a first illustration of a transaction delegated commit system in accordance with an embodiment of the invention. When the client 402 tries to communicate a process transaction, a plurality of servers (404, 406) can be contacted 408, 410 to determine which one will actually process the transaction. In some embodiments each server (404, 406) within the plurality of servers can act either as a commit server or as a participating server. The system provided by the invention is flexible as to the number and types of servers used. In one embodiment the first server contacted (in the example of FIG. 5 server A 404) becomes the commit server and coordinator. Other servers (i.e. server B 406 in FIG. 5) are then considered merely participating servers. Other implementations may use alternate mechanisms to select the commit server.

FIG. 6 shows a second illustration of the same transaction delegated commit system in accordance with an embodiment of the invention. The commit server chosen in the previous step now takes on responsibility for handling the commit process. The transaction process is handled by communication 412 between the client 402 and the commit server 404 alone, without any further communication between the client and the participating server 406. The commit server handles all transaction processing 414 with the participating server 406 (or servers if the transaction involves multiple participating servers). The commit server moves the transaction through the pre-preparing, preparing, logging, and commit steps on those participating servers. When the commit processing is complete, the commit server returns the commit to the client.

Figure 7:
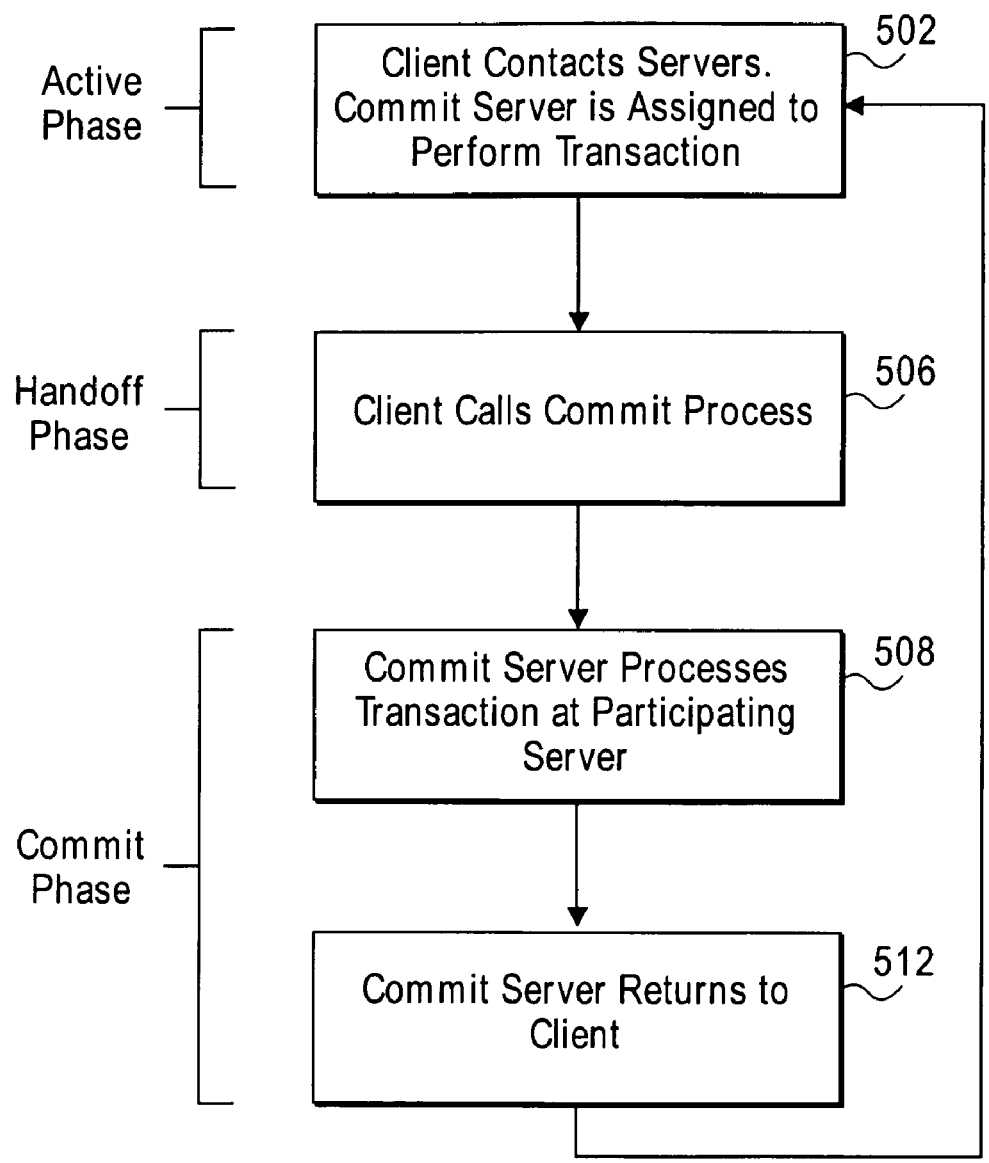
FIG. 7 shows a flowchart a transaction delegated commit process in accordance with an embodiment of the invention.

FIG. 7 shows a flowchart of a transaction delegated commit process in accordance with an embodiment of the invention. As shown in FIG. 7 the client or client applications contacts a plurality of transaction or application (step 502) servers. A commit server is assigned to perform the particular transaction, which in accordance with one embodiment is typically that server to which the client makes the first invocation. At some point (step 506) the client application will call the commit process. The commit server processes the transaction at the participating server, or servers (step 508). When the commit process completes the commit server returns to the client.

A client process (for example an applet), can obtain a reference to the UserTransaction and TransactionManager objects using the standard JNDI interface. Clients can begin a transaction using either object reference.

Checked transaction behavior provides transaction integrity by guaranteeing that a commit will not succeed unless all transactional objects involved in the transaction have completed the processing of their transactional requests. The Transaction Service provides checked transaction behavior that is equivalent to that provided by the request/response interprocess communication models defined by The Open Group.

Figure 8:
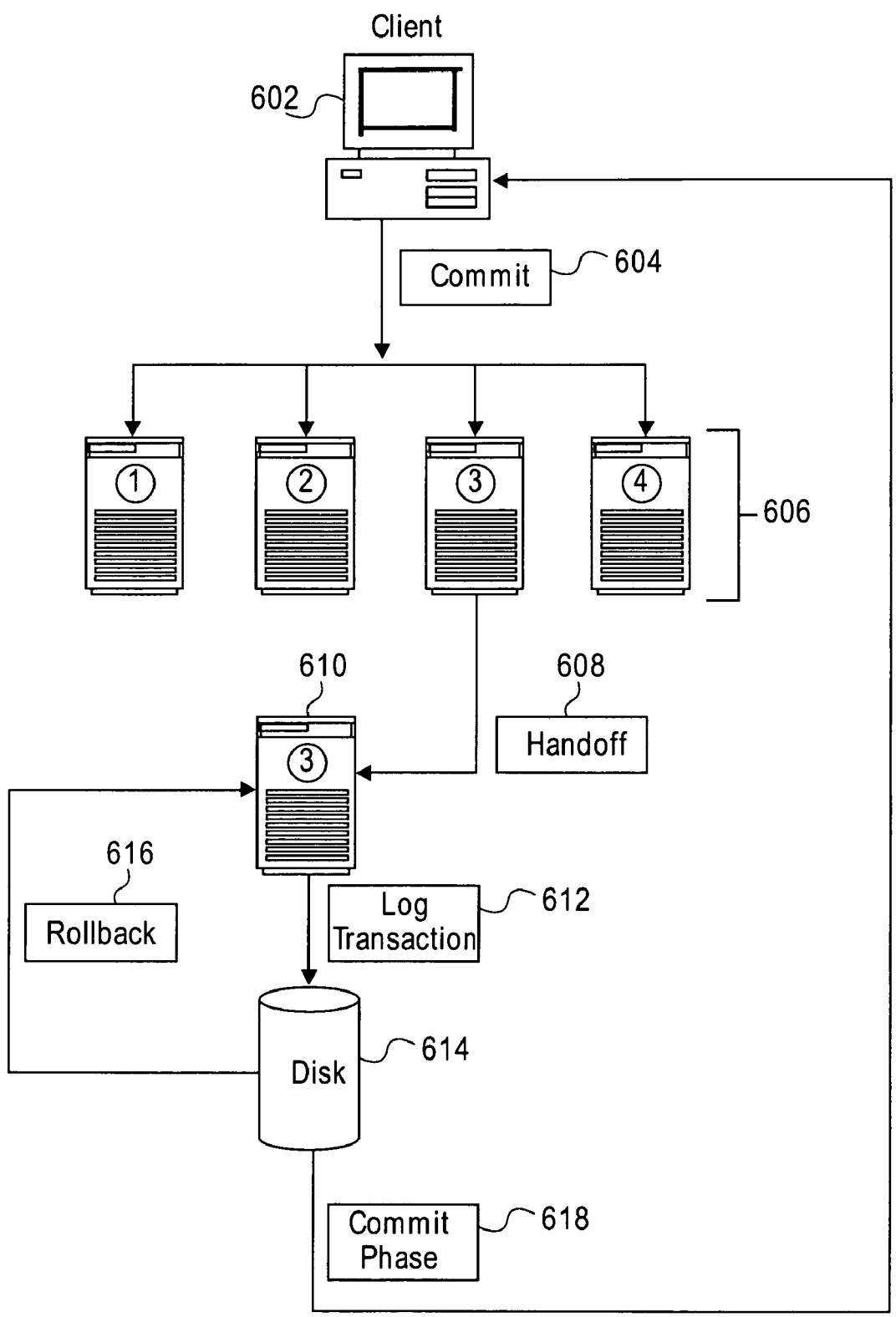
FIG. 8 shows a schematic illustration of a two-phase commit process in accordance with an embodiment of the invention.

FIG. 8 shows a schematic illustration of a system that can make use of a two-phase commit process in accordance with an embodiment of the invention. A client or client application 602 calls for a transaction commit 604, using for example a commit function. The transaction request is communicated to a plurality of servers 606. One of these servers 610 is chosen to act as the commit server for this particular transaction. Responsibility for the transaction commit is handed off to that commit server 610. In one embodiment, the commit server writes this transaction to a disk 614, where other (participating servers) can pick it up or operate upon it. Logging the transaction is part of the two phase commit protocol, and the purpose is to ensure atomicity of the transaction in the event of system failures. If, for example, the coordinating server crashes during the second commit phase, after the server is restarted it can make use of the logged transaction to complete the second commit phase. If necessary the commit server also handles any rollback functions 616 should the transaction fail. When the transaction is fully committed, the commit server returns the commit 618 to the client or calling application 602.

Figure 9B:
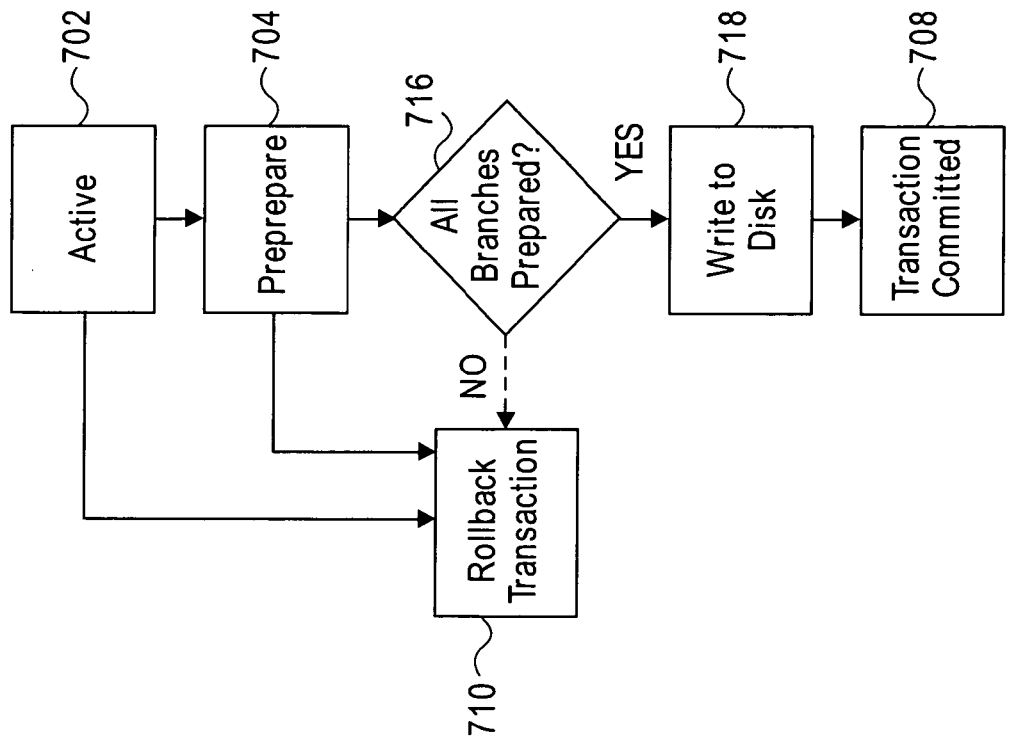
FIG. 9a and 9b shows a schematic illustration of a client transaction state machine in accordance with an embodiment of the invention.
Figure 9A:
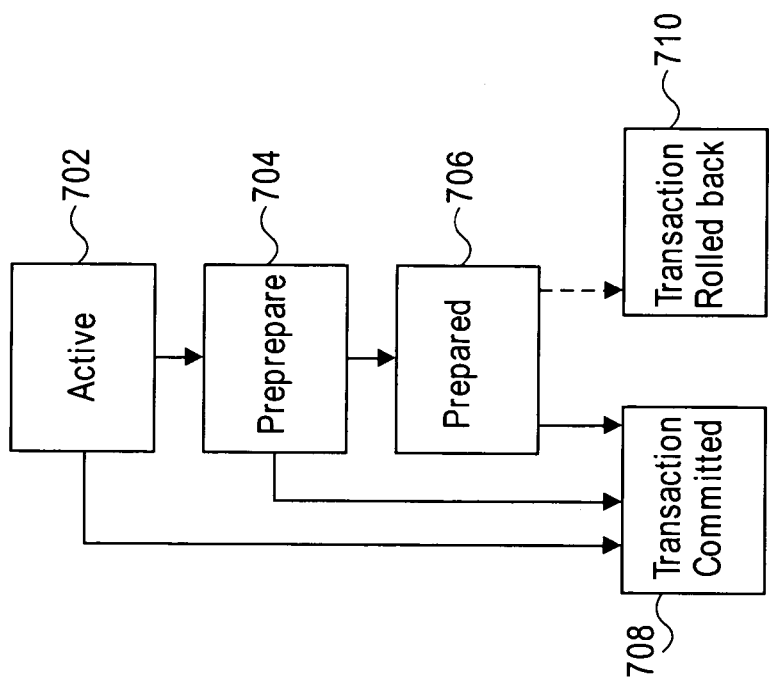
Figure 10:
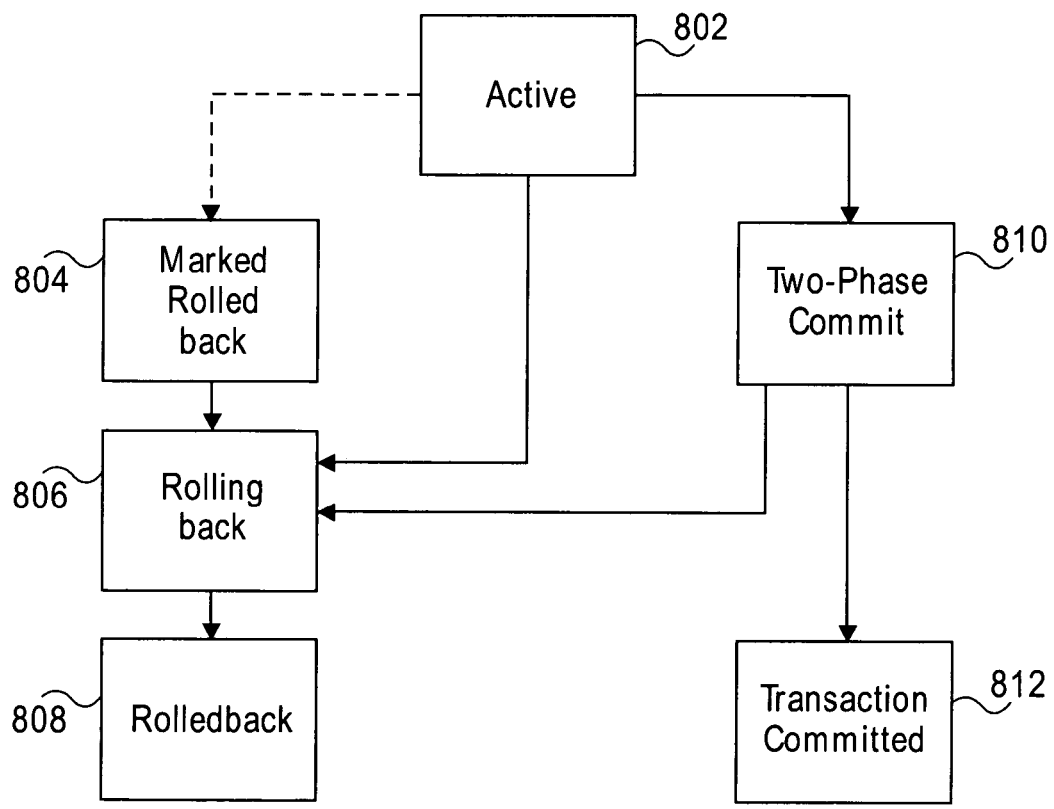
FIG. 10 shows a schematic illustration of a coordinator state machine in accordance with an embodiment of the invention.

FIGS. 9 through 11 show state machine diagrams of one embodiment of the invention. These state diagrams represent the various operations that may take place on a transaction during the transaction commit lifecycle. Throughout FIGS. 9 through 11 the solid lines indicate successful operations, while the dashed lines indicate unsuccessful (and ultimately rolled back) operations.

FIGS. 9a and 9b shows a schematic illustration of a client transaction state machine in accordance with an embodiment of the invention. In FIG. 9a, from the perspective of the client or client application, the transaction passes through an active phase 702 and is either committed 708, or rolled back 710. The preprepare phase 704 and prepare phase 706 phases are largely invisible to the client. FIG. 9b illustrates a similar process from a global viewpoint, and encompassing several transaction branches. In this example, the prepare phase 716 checks that all branches of the transaction are prepared. If they are all prepared, then the transactions are logged or written to disk (718). Otherwise, the transaction as a whole is rolled back 710.

FIG. 10 shows a schematic illustration of a transaction coordinator state machine in accordance with an embodiment of the invention. From the viewpoint of the transaction coordinator, the transaction must be handed off to a two-phase or delegated commit process, or instead it must be rolled back. During the active phase 802, transactions due to be rolled back are marked 804 for rolling back 806, and eventually rolled back 808. Transactions due for commit are sent to a two-phase commit process 810, and eventually committed 812. During the two-phase commit process, any transactions that fail are added to the roll-back list and eventually rolled back.

FIGS. 11a and 11b show schematic illustrations of a subcoordinator state machine in accordance with an embodiment of the invention. The subcoordinator is responsible for seeing the transaction through the preprepare 902, preparing 906, prepared 910 and committing phases 912. Additional steps can in some embodiments be used to confirm that the transaction is being prepared 904, and to log this preparedness into a transaction log 908.

Figure 12:
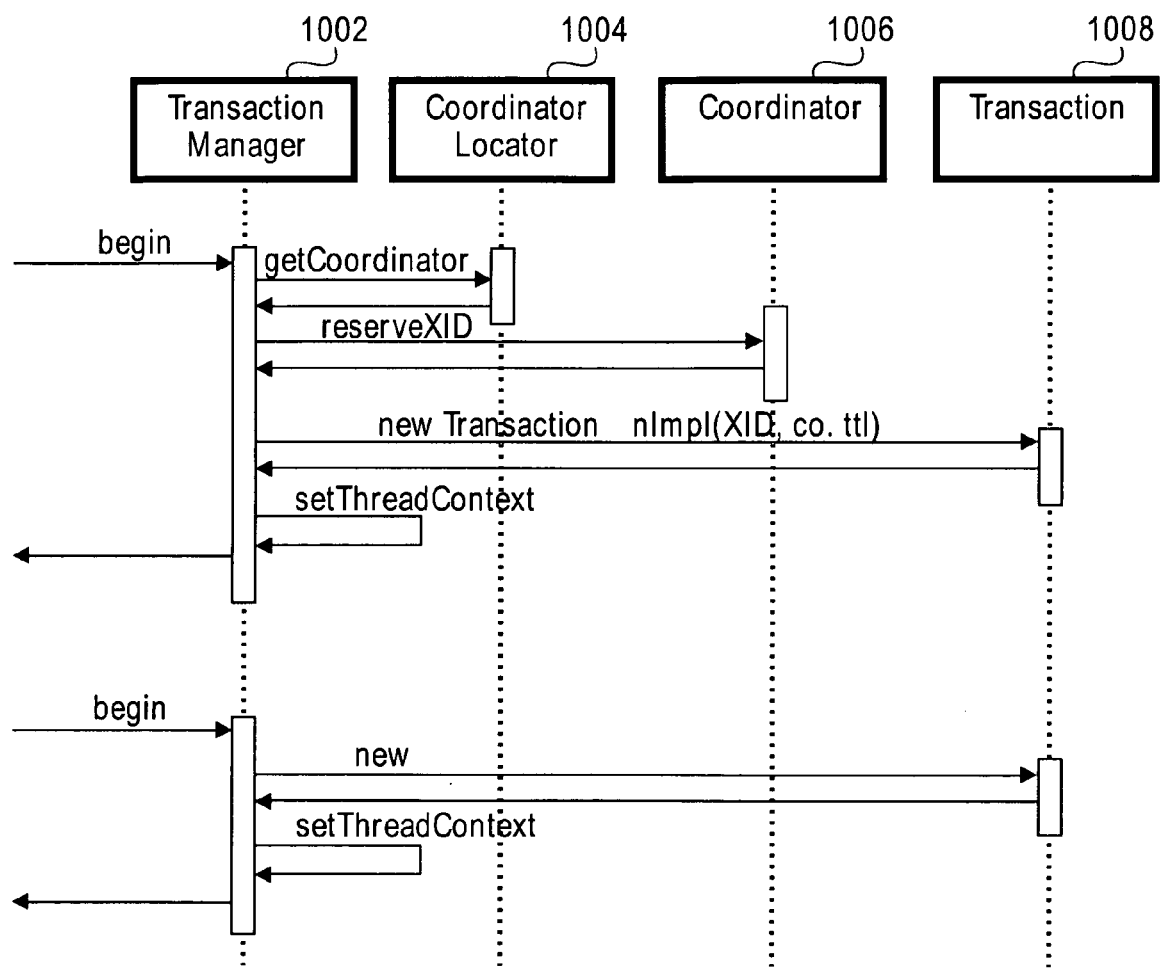
FIG. 12 shows an illustration of a begin transaction lifecycle in accordance with an embodiment of the invention.
Figure 13:
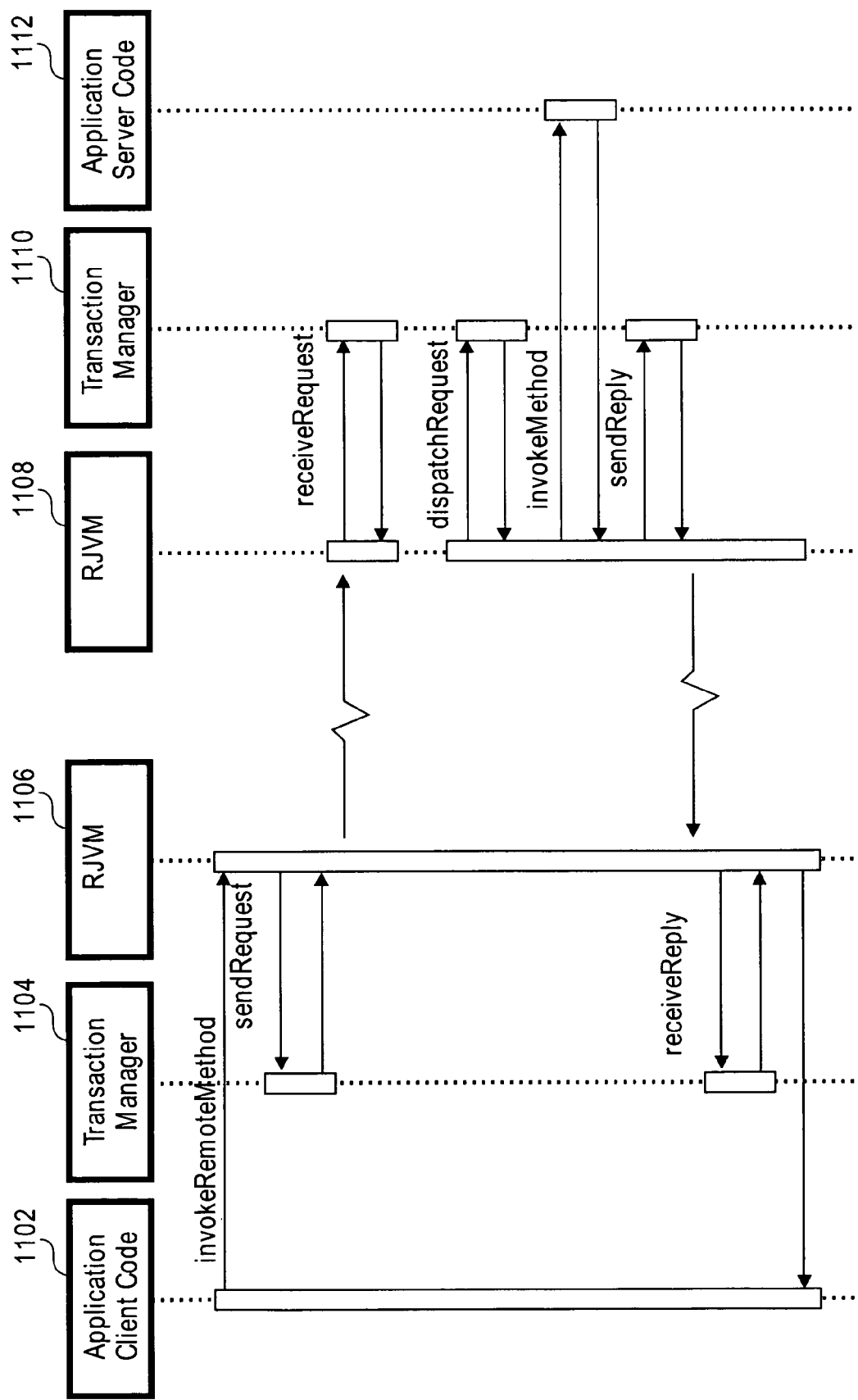
FIG. 13 shows an illustration of a transaction propagation lifecycle in accordance with an embodiment of the invention.
Figure 14:
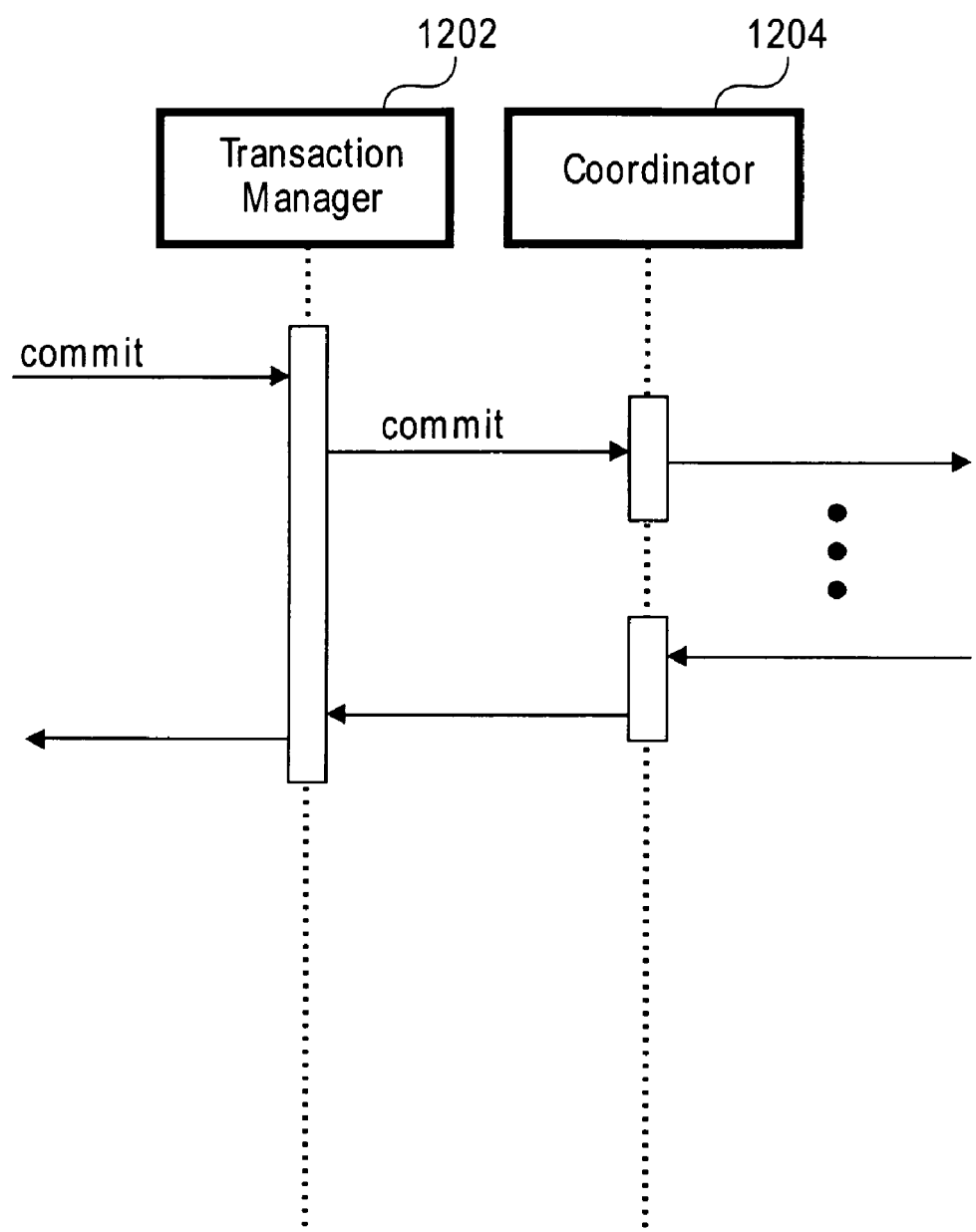
FIG. 14 shows an illustration of a commit lifecycle in accordance with an embodiment of the invention.

FIGS. 12 through 14 illustrate transaction related lifecycles in accordance with an embodiment of the invention. FIG. 12 shows an illustration of a begin transaction lifecycle in accordance with an embodiment of the invention. The transaction manager 1002 uses a coordinator location 1004 to find a transaction coordinator 1006 for this particular transaction, and to get a transaction ID. This transaction id is then used by a simple function to generate the transaction 1008. In other embodiments of the invention the getCoordinator 1004 and get transaction (reservedXID) 1006 steps are eliminated, and the transaction manager 1002 assigns a transaction identifier that it constructs by itself, using a pseudo-random number.

FIG. 13 shows an illustration of a transaction propagation lifecycle in accordance with an embodiment of the invention. The client application 1102 utilizes the transaction manager 1104 to pass a transaction to a client Java virtual machine 1106 the client Java virtual machine 1106 handles the communication of the transaction to a corresponding or similar server Java virtual machine 1108 at the remote server. The remote server includes a transaction manager 1110 in communication with a server application 1112. The server transaction manager 1110 is responsible for dispatching transaction commit requests, and sending replies to the client.

FIG. 14 shows an illustration of a commit lifecycle in accordance with an embodiment of the invention. On receiving the transaction commit request, the server transaction manager 1202 passes the commit request to the transaction coordinator 1204. When the commit is processed, the transaction manager 1202 returns the commit to the client or client application.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for transaction processing between a client and a server that allows responsibility for a transaction between a client process and a server process to be delegated to a commit server, comprising:
    a client process that obtains a reference to a transaction manager and initiates a transaction, wherein said transaction manager executes the active phase of said transaction within said client process, and wherein said client process further collects information during the active phase for use in a subsequent commit;
    a transaction coordinator, in communication with said client process, for determining from within a plurality of servers, a commit server, said commit server being responsible for committing said transaction; and
    a commit server, determined by said transaction coordinator, for receiving said information collected by the client during the active phase, committing said transaction at a server process at a participating server, said participating server being another of said plurality of servers, and communicating the result of said transaction commit process to said client process.

2. The system of claim 1 wherein said client process includes an active phase during which active phase the system monitors and records a subset of servers participating in a transaction.

3. The system of claim 2 wherein the first server contacted of said plurality of servers is designated as the commit server.

4. The system of claim 1 wherein said commit server moves said transaction through a preparing, logging and commit phases at said participating server.

5. The system of claim 1 wherein said commit server returns the commit to the client process.

6. The system of claim 1 wherein said commit server includes a transaction storage for storing said transaction prior to commit.

7. The system of claim 6 including a rollback processor for rolling back said transaction should said transaction fail to commit at said participating server.

8. The system of claim 1 wherein each of said plurality of servers includes a transaction coordinator.

9. The system of claim 1 wherein said transaction interface extends the Java J2EE JTA transaction interface.

10. The system of claim 1 wherein said client process includes an active phase during which active phase the system maintains a timer that limits the active phase of said transaction, and rolls back said transaction if it does not finish within a specified timeout interval.

11. The system of claim 1 wherein said client process includes an active phase during which active phase the system tracks all communication with servers and ensures there are no outstanding communication requests when said transaction is committed.

12. The system of claim 1 wherein the participating server is also the commit server.

13. The system of claim 1 wherein the participating server is not the commit server.

14. A method for transaction processing between a client and a server that allows responsibility for a transaction between a client process and a server process to be delegated to a commit server, comprising the steps of:
- obtaining a reference to a transaction manager by a client process;
- initiating a transaction using said transaction manager;
- executing an active phase in said client process and collecting information thereof;
- determining from within a plurality of servers, a commit server, said commit server being responsible for committing said transaction;
- handing off said transaction to said commit server by said client process, including sending to said commit server the information collected during the active phase; and
- committing said transaction at a server process at a participating server, said participating server being another of said plurality of servers, and communicating the result of said transaction commit process to said client process.

15. The method of claim 14 wherein said client process includes an active phase during which said transaction manager locator contacts a subset of said plurality of servers.

16. The method of claim 15 wherein the first server contacted of said plurality of servers is designated as the commit server.

17. The method of claim 14 wherein said commit server moves said transaction through a preparing, logging and commit phases at said participating server.

18. The method of claim 14 wherein said commit server returns the commit to the client process.

19. The method of claim 14 wherein said commit server includes a transaction storage for storing said transaction prior to commit.

20. The method of claim 19 including a rollback processor for rolling back said transaction should said transaction fail to commit at said participating server.

21. The method of claim 14 wherein each of said plurality of servers includes a transaction coordinator.

22. The method of claim 14 wherein said transaction interface extends the Java J2EE JTA transaction interface.

23. The method of claim 14 wherein said client process includes an active phase during which active phase the system maintains a timer that limits the active phase of said transaction, and rolls back said transaction if it does not finish within a specified timeout interval.

24. The method of claim 14 wherein said client process includes an active phase during which active phase the system tracks all communication with servers and ensures there are no outstanding communication requests when said transaction is committed.

25. The method of claim 14 wherein the participating server is also the commit server.

26. The method of claim 14 wherein the participating server is not the commit server.

27. The method of claim 26 wherein said participating server is another of said plurality of servers.

* * * * *